(12) United States Patent
Foster

(10) Patent No.: US 7,117,836 B2
(45) Date of Patent: Oct. 10, 2006

(54) AUTOMOTIVE STARTING SYSTEM AND METHOD

(75) Inventor: Randy C. Foster, Strafford, MO (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/939,840

(22) Filed: Sep. 13, 2004

(65) Prior Publication Data

US 2006/0053790 A1 Mar. 16, 2006

(51) Int. Cl.
*F02N 7/00* (2006.01)
*F02N 11/00* (2006.01)

(52) U.S. Cl. ............................. 123/179.4; 123/179.31; 60/627; 60/629

(58) Field of Classification Search ...................... None
See application file for complete search history.

(56) References Cited

U.S. PATENT DOCUMENTS 6,460,500 B1 * 10/2002 Ooyama et al. ......... 123/179.4
6,615,786 B1 * 9/2003 Mori et al. ............ 123/179.31

* cited by examiner

*Primary Examiner*—Andrew M. Dolinar
(74) *Attorney, Agent, or Firm*—Joseph V. Tassone; Thompson Hine, LLP

(57) ABSTRACT

An automotive starting system includes an accumulator, a hydraulic motor, and an engine controller. The accumulator is adapted for holding a charge of pressurized fluid. The hydraulic motor has a fluid input operatively connected to the accumulator and has an output shaft operatively connected to an internal combustion engine of an automotive vehicle. The engine controller shuts off the engine if an idle engine condition exists and restarts the engine using the hydraulic motor following an idle engine shut-off if a predetermined engine-start condition exists. A method for starting an internal combustion engine of an automotive vehicle includes having the engine controller shut off the engine if an idle engine condition exists and thereafter having the engine controller restart the engine using the hydraulic motor if a predetermined engine-start condition exists.

12 Claims, 3 Drawing Sheets ated starter/generator either on the front end accessory drive or engaged with the flywheel in a suitable arrangement. This typically requires using a nominal 42-volt electrical system instead of a nominal 12-volt electrical system for all but smaller displacement engines. Such designs add considerable complexity to the vehicle and add corresponding cost and weight. After an idle engine shut-off has occurred, the engine controller uses the electric starter motor to restart the engine when a predetermined engine-start condition exists. An example of an engine-start condition includes the presence of the key in the ignition ("Key-On") since the idle engine shut-off and the absence of brake pressure.

AUTOMOTIVE STARTING SYSTEM AND METHOD

TECHNICAL FIELD

The present invention relates generally to an automotive vehicle having an internal combustion engine, and more particularly to an automotive starting system for starting the engine following an idle engine shut-off if a predetermined engine-start condition exists.

BACKGROUND OF THE INVENTION

The automotive industry has utilized an electric starter engine powered by an automotive vehicle's 12-volt battery for an operator to start the internal combustion engine of the vehicle. However, known automotive designs include using an engine controller to temporarily shut off the engine to reduce fuel consumption and emissions if the engine is in an idle-engine state. An example of an idle-engine state includes the vehicle being stopped for a predetermined time threshold such as can occur when the vehicle encounters a traffic light. These designs usually employ an integrated starter/generator either on the front end accessory drive or engaged with the flywheel in a suitable arrangement. This typically requires using a nominal 42-volt electrical system instead of a nominal 12-volt electrical system for all but smaller displacement engines. Such designs add considerable complexity to the vehicle and add corresponding cost and weight. After an idle engine shut-off has occurred, the engine controller uses the electric starter motor to restart the engine when a predetermined engine-start condition exists. An example of an engine-start condition includes the presence of the key in the ignition ("Key-On") since the idle engine shut-off and the absence of brake pressure.

Known designs of certain diesel trucks (such as that disclosed in U.S. Pat. No. 5,528,901) include using an electric starter motor to start an auxiliary diesel engine to power an air compressor to power a separate pneumatic starter motor of a main diesel engine to start the main diesel engine. The operator uses only the auxiliary diesel engine when the truck is at a truck stop to power auxiliary equipment, and the operator starts and uses the main diesel engine when the truck is traveling on the road.

Still, scientists and engineers continue to seek improved automotive starting systems.

SUMMARY OF THE INVENTION

A first embodiment of the invention is for an automotive starting system having an accumulator, a hydraulic motor, and an engine controller. The accumulator is adapted for holding a charge of pressurized fluid. The hydraulic motor has a fluid input operatively connected to the accumulator and has an output shaft operatively connected to an internal combustion engine of an automotive vehicle. The engine controller shuts off the engine if an idle engine condition exists and restarts the engine using the hydraulic motor following an idle engine shut-off if a predetermined engine-start condition exists.

A second embodiment of the invention is for an automotive starting system including an accumulator, a hydraulic motor, an engine controller, and an electric motor. The accumulator is adapted for holding a charge of pressurized fluid. The hydraulic motor has a fluid input operatively connected to the accumulator and has an output shaft operatively connected to an internal combustion engine of an automotive vehicle. The engine controller shuts off the engine if an idle engine condition exists and restarts the engine using the hydraulic motor following an idle engine shut-off if a predetermined engine-start condition exists. The electric motor has an input operatively connected to a battery of the automotive vehicle, has an output shaft operatively connected to the engine, and is adapted for starting the engine based on an action taken by an operator of the automotive vehicle.

A method of the invention is for starting an internal combustion engine of an automotive vehicle and includes steps a) through e). Step a) includes obtaining an accumulator adapted for holding a charge of pressurized fluid. Step b) includes obtaining a hydraulic motor having a fluid input operatively connected to the accumulator and having an output shaft operatively connected to the engine. Step c) includes obtaining an engine controller. Step d) includes starting the engine. Step e) includes, after step d), having the engine controller shut off the engine if an idle engine condition exists. Step f) includes, after step e), having the engine controller restart the engine using the hydraulic motor if a predetermined engine-start condition exists.

Several benefits and advantages are derived from one or more of the embodiments and the method of the invention. Having an engine controller which shuts off the engine when the engine is in an idle engine condition reduces fuel consumption and emissions. In one example, having a hydraulic motor to restart the engine following an idle engine shut-off, if a predetermined engine-start condition exists, eliminates using a nominal 42-volt electrical system to power an electric motor for such restarts of even moderate to large displacement engines which allows the automotive vehicle to keep a lower cost and weight of a nominal 12-volt electrical system. In the same or a different example, having such a hydraulic motor provides for a silent restart which is not affected by the condition (e.g., temperature) of any battery.

DESCRIPTION OF THE PREFERRED EMBODIMENTS

Figure 1:
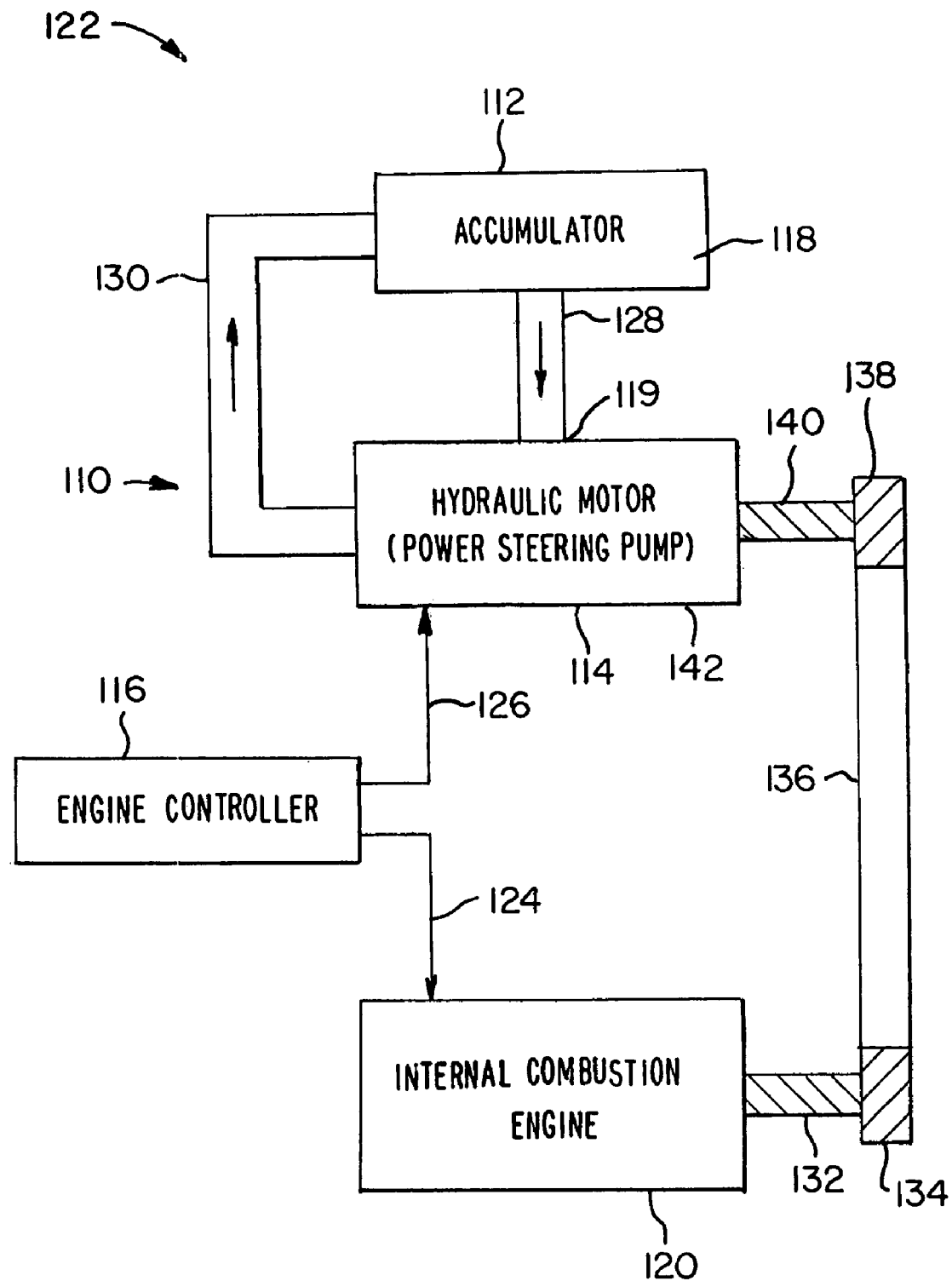
FIG. 1 is a block diagram of a first embodiment of an automotive starting system of the invention together with some other components of an automotive vehicle, wherein the hydraulic motor is the power steering pump.

Referring now to the drawings, FIG. 1 illustrates a first embodiment of the present invention. A first expression of the embodiment shown in FIG. 1 is for an automotive starting system 110 including an accumulator 112, a hydraulic motor 114, and an engine controller 116. The accumulator 112 is adapted for holding a charge of pressurized fluid 118. The hydraulic motor 114 has a fluid input 119 operatively connected to the accumulator 112 and has an output shaft 140 operatively connected to an internal combustion engine 120 of an automotive vehicle 122. The engine controller 116 shuts off the engine 120 if an idle engine condition exists and restarts the engine 120 using the hydraulic motor 114 following an idle engine shut-off if a predetermined engine-start condition exists.

For purposes of describing the invention, an automotive vehicle is a self-propelled vehicle which travels on land on-road and/or off-road. Automotive vehicles which have an internal combustion engine include, without limitation, gasoline and diesel powered cars and trucks. An example of an idle-engine state includes the vehicle being stopped for a predetermined time threshold such as can occur when the vehicle encounters a traffic light. An example of an engine-start condition includes the presence of the key in the ignition ("Key-On") since the idle engine shut-off and the absence of brake pressure. Other examples are left to the artisan.

In one application of the first expression of the embodiment of FIG. 1, the engine 120 is the only internal combustion engine of the automotive vehicle 122. In the same or a different application, the pressurized fluid 119 consists essentially of (and in one variation consists of) at least one pressurized liquid.

In one construction of the first expression of the embodiment of FIG. 1, the engine shut-off signal 124 from the engine controller 116 is shown schematically as going to the engine 120 wherein it is understood that various methods for shutting off the engine are left to the artisan. In this construction, the engine restart signal 126 from the engine controller 116 is shown schematically as going to the hydraulic motor 114 wherein it is understood that various methods for activating the hydraulic motor 114 (such as opening a valve, not shown, in the accumulator 112) are left to the artisan. In this construction, wherein unnumbered arrows in FIG. 1 indicate the direction of fluid flow, a first fluid conduit 128 connects the output of the accumulator 112 to the fluid input 119 of the hydraulic motor 114, and a second fluid conduit 130 is used to return the fluid 118 from the hydraulic motor 114 to the accumulator 112 through an intervening pump and reservoir. In this construction, the engine 120 has a crankshaft 132 (shown in cross section) with an attached pulley 134 (shown in cross section) which is rotated by a belt 136 turned, during an engine-controller-initiated engine restart, by a pulley 138 attached to the output shaft 140 of the hydraulic motor 114. Various details of such construction, including valves, are left to, and are within the ordinary level of skill of, the artisan. Other constructions, including having the engine restart signal 126 from the engine controller 116 go to the accumulator 112, are left to those skilled in the art.

In one enablement of the first expression of the embodiment of FIG. 1 the hydraulic motor 114 is a power steering pump 142 of the automotive vehicle 122, and the power steering pump 142 is adapted to charge the accumulator 112. In one variation, the engine 120 has a crankshaft 132, and the power steering pump 142 is operatively connected to the crankshaft 132 by a belt 136 (or other suitable means such as a drive wheel or gears).

In one employment of the first expression of the embodiment of FIG. 1, the accumulator 112 is charged in the factory or at the dealership and is recharged by the power steering pump 142 during engine operation. In one variation, the hydraulic motor 114 (which in this enablement is the power steering pump 142) is activated by the operator of the automotive vehicle 122 when the operator desires to start the engine 120 such as when leaving home to drive to work and is activated by the engine controller 116 if an idle engine condition exists such as when the automotive vehicle 122 has been stopped for a threshold time at a traffic light.

Figure 2:
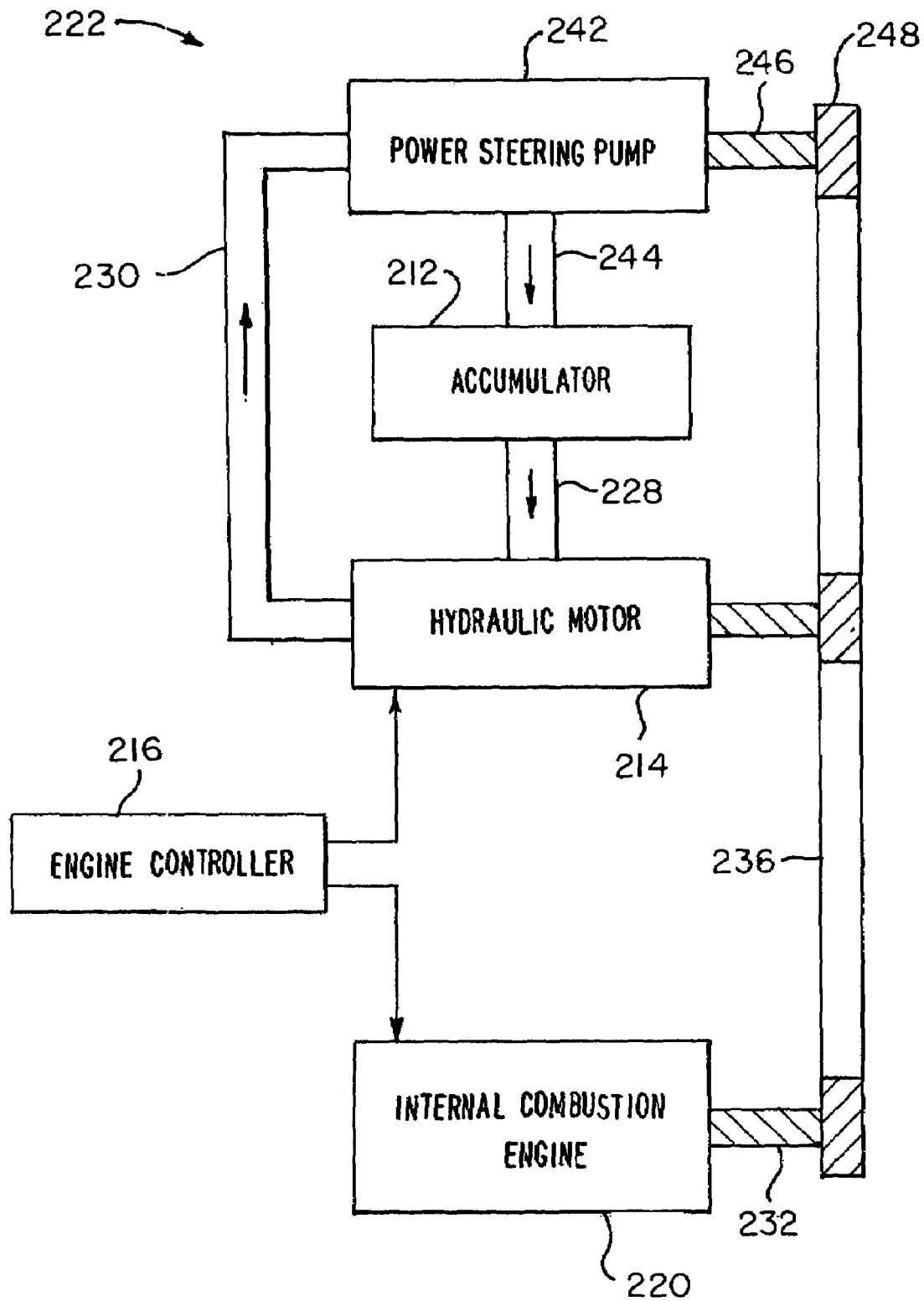
FIG. 2 is a view, as in FIG. 1, but of a first alternate embodiment wherein the hydraulic motor is distinct from the power steering pump.

In a first alternate embodiment, as shown in FIG. 2, the automotive vehicle 222 has a power steering pump 242 adapted to charge the accumulator 212, and the power steering pump 242 is distinct from the hydraulic motor 214. In one variation, the engine 220 has a crankshaft 232, and the hydraulic motor 214 is operatively connected to the crankshaft 232 by a belt 236.

In one construction of the first alternate embodiment of FIG. 2, a first fluid conduit 228 connects the accumulator 212 and the hydraulic motor 214, a second fluid conduit 230 connects the hydraulic motor 214 and the power steering pump 242, and a third fluid conduit 244 connects the power steering pump 242 and the accumulator 212, wherein the shaft 246 of the power steering pump 242 has an attached pulley 248 which is turned by the belt 236.

In one employment of the first alternate embodiment of FIG. 2, the accumulator 212 is charged in the factory or at the dealership and is recharged by the power steering pump 242 during engine operation. In one variation, the hydraulic motor 214 (which in this enablement is separate from the power steering pump 242) is activated by the operator of the automotive vehicle 222 when the operator desires to start the engine 220 such as when leaving home to drive to work and is activated by the engine controller 216 if an idle engine condition exists such as when the automotive vehicle 222 has been stopped for a threshold time at a traffic light.

Figure 3:
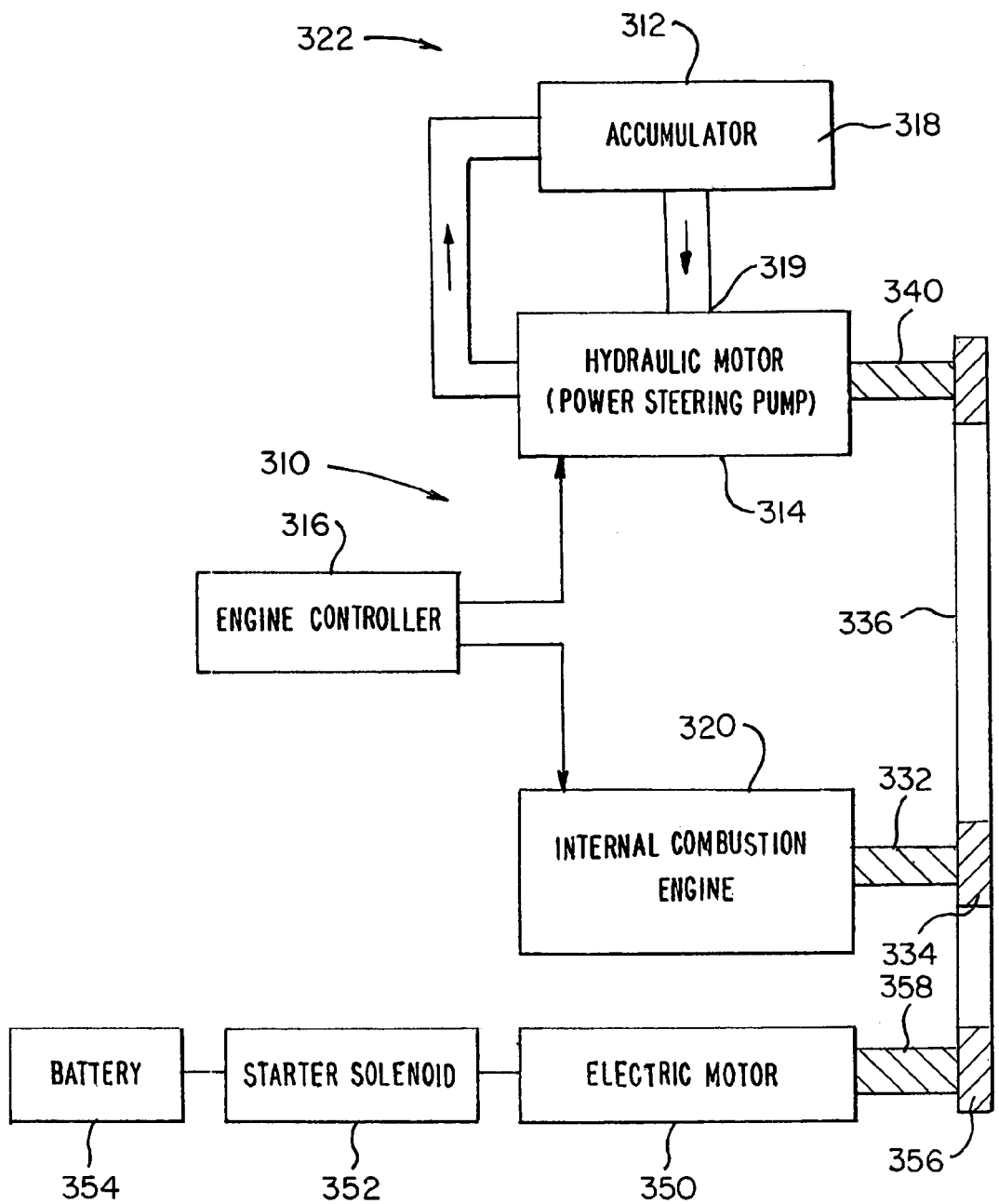
FIG. 3 is a block diagram of a second embodiment of an automotive starting system of the invention together with some other components of an automotive vehicle, wherein the hydraulic motor is the power steering pump and also including an electric motor.

Referring again to the drawings, FIG. 3 illustrates a second embodiment of the present invention. A first expression of the embodiment shown in FIG. 3 is for an automotive starting system 310 including an accumulator 312, a hydraulic motor 314, an engine controller 316, and an electric motor 350. The accumulator 312 is adapted for holding a charge of pressurized fluid 318. The hydraulic motor 314 has a fluid input 319 operatively connected to the accumulator 312 and has an output shaft 340 operatively connected to an internal combustion engine 320 of an automotive vehicle 322. The engine controller 316 shuts off the engine 320 if an idle engine condition exists and restarts the engine 320 using the hydraulic motor 314 following an idle engine shut-off if a predetermined engine-start condition exists.

In one construction, of the first expression of the embodiment of FIG. 3, starter solenoid 352 connects a battery 354 of the automotive vehicle 322 to the electric motor 350 In this construction, the engine 320 has a crankshaft 332 (shown in cross section) with an attached pulley 334 (shown in cross section) which is rotated by a belt 336 turned, during an operator-initiated engine start, by a pulley 356 attached to the output shaft 358 of the electric motor 350. In the same or a different construction, the battery 354 is a nominal 12-volt battery.

The enablements, variations, etc. of the first embodiment of FIG. 1 and the first alternate embodiment of FIG. 2 are equally applicable, as appropriate, to the third embodiment of FIG. 3, as can be appreciated by the artisan.

A method of the invention is for starting an internal combustion engine 120 of an automotive vehicle 122 and includes steps a) through f). Step a) includes obtaining an accumulator 112 adapted for holding a charge of pressurized fluid 118. Step b) includes obtaining a hydraulic motor 114 having a fluid input 119 operatively connected to the accumulator 112 and having an output shaft 140 operatively connected to the engine 120. Step c) includes obtaining an engine controller 116. Step d) includes starting the engine 120. Step e) includes, after step d), having the engine controller 116 shut off the engine 120 if an idle engine condition exists. Step f) includes, after step e), having the engine controller 116 restart the engine 120 using the hydraulic motor 114 if a predetermined engine-start condition exists.

In one enablement of the method, the hydraulic motor 114 is a power steering pump 142 of the automotive vehicle 122, and the power steering pump 142 is adapted to charge the accumulator 112. In one variation, the engine 120 has a crankshaft 132, and the power steering pump 142 is operatively connected to the crankshaft 132 by a belt 136. In one modification of the method, the automotive vehicle 122 includes a steering gear (not shown), wherein the power steering pump 142 (whether separate from, or acting as, the hydraulic motor 114) is switchable between being fluidly connected to the steering gear and being fluidly connected to the accumulator 112.

In one employment of the method, step d) is performed by the hydraulic motor 114 under operator direction. In a different employment, the method also includes the step of obtaining an electric motor 350 having an input operatively connected to a battery 354 and having an output shaft 358 operatively connected to the engine 320, wherein step d) is performed by the electric motor 350 under operator direction. In one variation, the battery is a nominal 12-volt battery.

In one extension of the method, there is also included, between steps d) and e), the step of determining if the engine 120 is in an engine idle state. In the same or a different extension, there is also included, between e) and f), the step of determining if the predetermined engine-start condition exists.

Several benefits and advantages are derived from one or more of the embodiments and the method of the invention. Having an engine controller which shuts off the engine when the engine is in an idle engine condition reduces fuel consumption and emissions. In one example, having a hydraulic motor to restart the engine following an idle engine shut-off, if a predetermined engine-start condition exists, eliminates using a nominal 42-volt electrical system to power an electric motor for such restarts of even moderate to large displacement engines which allows the automotive vehicle to keep a lower cost and weight of a nominal 12-volt electrical system. In the same or a different example, having such a hydraulic motor provides for a silent restart which is not affected by the condition (e.g., temperature) of any battery.

The foregoing description of several expressions of embodiments and a method of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. An automotive starting system comprising:
    a) an accumulator adapted for holding a charge of pressurized fluid;
    b) a hydraulic motor having a fluid input operatively connected to the accumulator and having an output shaft operatively connected to an internal combustion of an automotive vehicle; and
    c) an engine controller which shuts off the engine if an idle engine condition exists and which restarts the engine using the hydraulic motor following an idle shut-off if a predetermined engine-start condition exists;
    d) wherein the hydraulic motor is a power steering pump of the automotive vehicle, and wherein the power steering pump is adapted to charge the accumlator.

2. The automotive starting system of claim 1, wherein the engine has a crankshaft, and wherein the power steering pump is operatively to the crankshaft by a belt.

3. The automotive starting system of claim 1 further comprising an electric motor having an input operatively connected to a battery of the automotive vehicle, having an output shaft operatively connected to the engine, and adapted for starting the engine based on an action taken by an operator of the automotive vehicle.

4. The automotive starting system of claim 3, wherein the battery is a normal 12-volt battery.

5. A method for starting an internal combustion engine of an automotive vehicle comprising the steps of:
    a) obtaining an accumulator adapted for holding a charge of pressurized fluid;
    b) obtaining a hydraulic motor having a fluid input operatively connected to the accumulator and having an output shaft operatively connected to the engine, wherein the hydraulic motor is a power steering pump of the automotive vehicle, and wherein the power steering pump is adapted to charge the accumulator;
    c) obtaining an engine controller;
    d) starting the engine;
    e) after step d), having the engine controller shut off the engine if an idle engine condition exists; and
    f) after step e), having the engine controller restart the engine using the hydraulic motor if a predetermined engine-start condition exists.

6. The method of claim 5, wherein the engine has a crankshaft, and wherein the power steering pump is operatively connected to the crankshaft, and 7. The method of claim 5, wherein the automotive vehicle includes a steering gear, wherein the power steering pump is switchable between being fluidly connected to the steering gear and being fluidly connected to the accumulator.

8. The method of claim 5, wherein step d) is performed by the hydraulic motor under operator direction.

9. The method of claim 5, also including, between steps d) and e), the step of determining if the engine is in an engine idle state.

10. The method of claim 9, also including, between e) and f), the step of determining if the predetermined engine-start condition exists.

11. The method of claim 5 further including the step of obtaining an electric motor having an input operatively connected to a battery and having an output shaft operatively connected to the engine, wherein step d) is performed by the electric motor under operator direction.

12. The method of claim 11, wherein the battery is a nominal 12-volt battery.

* * * * *